Oct. 31, 1967 R. M. BECK ET AL 3,350,569

CLOCK GENERATOR

Filed July 1, 1963 2 Sheets-Sheet 1

INVENTORS
Robert M. Beck
Donald B. Cachelin
By Smyth, Roston & Pavitt
Attorneys

Oct. 31, 1967 R. M. BECK ET AL 3,350,569

CLOCK GENERATOR

Filed July 1, 1963 2 Sheets-Sheet 2

INVENTORS:
Robert M. Beck
Donald B. Cachelin
By Smyth, Roston & Pavitt
Attorneys United States Patent Office 3,350,569
Patented Oct. 31, 1967

3,350,569

CLOCK GENERATOR

Robert M. Beck, Los Angeles, and Donald B. Cachelin, West Los Angeles, Calif., assignors to Scientific Data Systems, Inc., Santa Monica, Calif., a corporation of Delaware Filed July 1, 1963, Ser. No. 291,634
21 Claims. (Cl. 307—88.5)

This application relates to a clock generator and a flip-flop circuit which may be used in a computer. More specifically, the invention relates to a clock generator and an interconnected flip-flop with the pulses produced by the clock generator controlling the operation of the flip-flop so as to give an improved result within the computer.

In the past it has been desirable to have a constant voltage signal used throughout a computer as a clock signal. The clock signal should remain constant in the various circuits in which it is used regardless of variations in load throughout the computer. Also, the clock signal should maintain an average value which is stable over long periods of time. Another problem which has occurred in computers is the development of spurious signals which enter into the clock signal and destroy its validity and accuracy.

When the clock signals are applied to flip-flop circuits within the computer it is desirable that the flip-flop circuits quickly respond to the clock signals to change their state during a minimum period of time. In order to achieve this result the flip-flop circuits must be sensitive and in the past these sensitive circuits could be triggered by spurious noise signals. This invention contemplates a flip-flop circuit having novel triggering means to activate the flip-flop from one stable state to another during a very short interval of time. Also, the triggering of the circuit by spurious noise signals is eliminated.

The invention as described in the application includes a clock generator which produces cyclically recurring pulses. These pulses are applied to a plurality of individual driver circuits. Each circuit, for example, has parallel connected transformer means associated with it to produce two clock pulses. Each driver circuit is independent of the other driver circuits and variations in the load on any one driver circuit do not affect the output of the other driver circuits. Means are included within the individual driver circuits to maintain the accuracy of the clock pulses over successive cycles. That is, the average amplitude value of the clock pulses is maintained at a constant value to eliminate false indications within the computer.

The clock pulses are distributed throughout the computer by ungrounded circuit leads. The use of an ungrounded distribution system isolates the clock pulses from the general ground system within the computer. This isolation helps to maintain the waveform of the clock pulses by eliminating the incorporation of spurious noise signals within the clock pulses. The wires which distribute the clock pulses are also twisted into close proximity. The twisting eliminates radiation of the clock pulses and also reduces the impedance of the circuit path that the clock pulses must follow. Maintaining a low impedance within the distribution system helps to eliminate losses and inaccuracies in the clock pulses.

The clock pulse is applied to an input circuit associated with a flip-flop to control the triggering of the flip-flop. The flip-flop is preset by either a "set" or "reset" signal so that when the clock pulse is applied the initiation of the triggering action may begin. The triggering of the flip-flop is not done immediately but energy is stored within an inductive circuit during the time duration of the clock pulse. When the clock pulse subsides the triggering occurs. The energy which has been stored in the inductive circuit is used to quickly switch the flip-flop from one stable state to another.

After the switching of the flip-flop takes place, one side of the flip-flop is conductive and the other side is non-conductive and feedback means are incorporated to insure that the conductive side maintains its state and that the non-conductive side maintains its state. The invention also includes unidirectional means included in the feedback paths between the two halves of the flip-flop. The unidirectional means isolate the two halves of the flip-flop from low voltage spurious signals which could accidentally trigger the flip-flop to give an incorrect response in the computor.

A clearer understanding of the invention will be had with reference to the following drawings, wherein.

Figure 1:
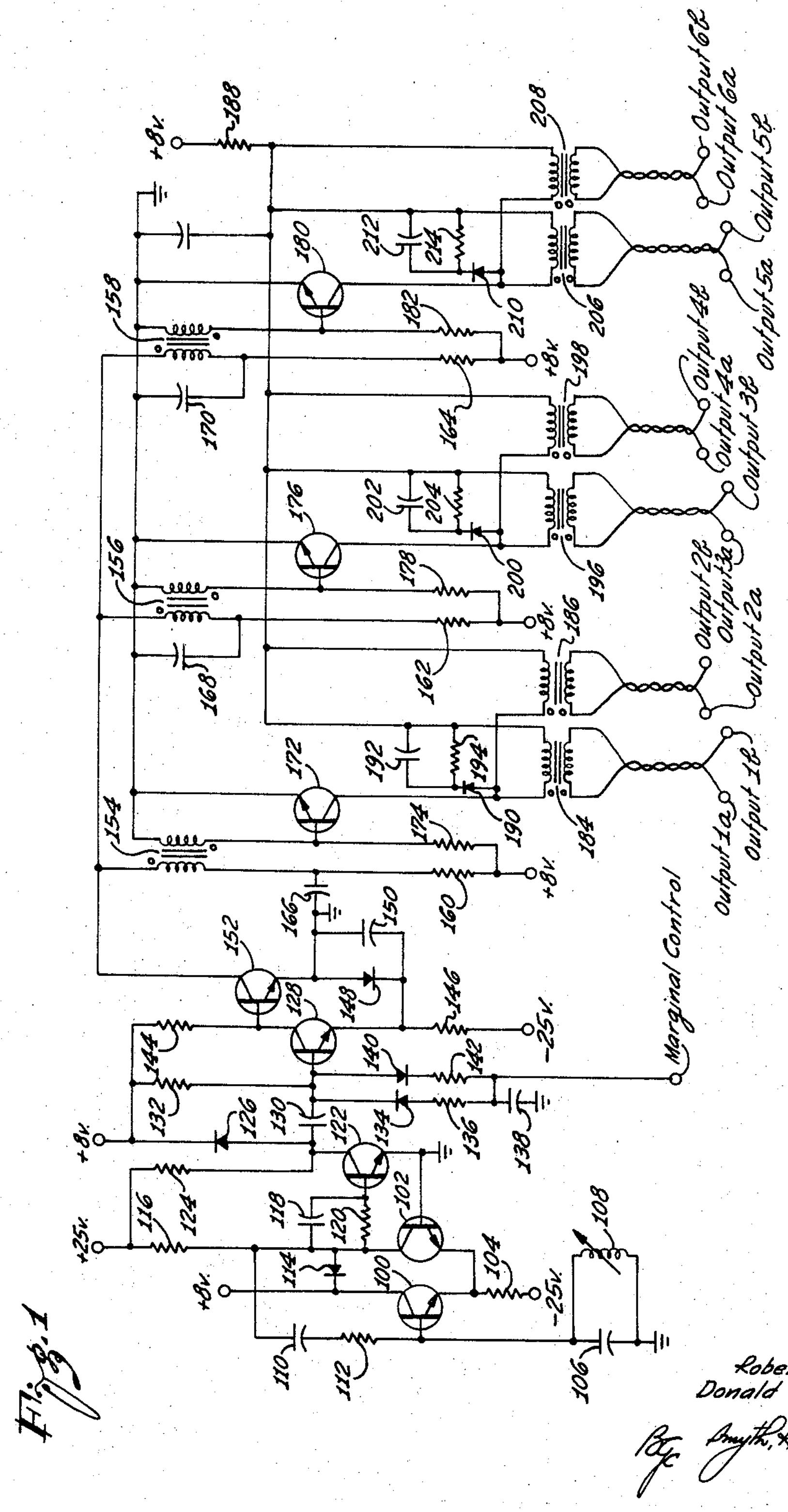
FIGURE 1 is a schematic diagram of a clock generator for producing a plurality of individual clock pulse signals.

In FIGURE 1 a pair of NPN transistors 100 and 102 are part of a push-pull oscillator. The emitters of the transistors are connected together and electrically disposed through a resistance 104 to a negative source of voltage. For example, the negative source of voltage may have a value on the order of −25 volts. A parallel resonant circuit consisting of a capacitor 106 and a variable inductor 108 is connected between the base of the transistor 100 and a reference potential such as ground. A series circuit including a capacitor 110 and a resistor 112 is disposed between the base of the transistor 100 and the collector of the transistor 102. The collector of the transistor 100 is connected to a positive source of voltage, for example, a voltage source having a value on the order of +8 volts.

A diode 114 is connected between the collectors of the transistors 100 and 102. Also, the collector of the transistor 102 is connected to a positive source of voltage through a resistor 116. The positive source of voltage may have a value on the order of +25 volts. The three sources of voltage which have been described are present throughout the circuitry of the invention and will be referred to as the negative source of voltage, the low positive source of voltage, and the high positive source of voltage. The base of the transistor 102 is connected to a reference potential such as ground. As indicated before, the transistors 100 and 102 plus the associated circuitry form a push-pull transistor oscillator. The inductor 108 which is part of the parallel resonant circuit is varied to control the frequency of oscillation. The output from the oscillator circuit is taken from the collector of transistor 102 through an RC coupling circuit composed of capacitor 118 and resistor 120.

The output from the oscillator is connected to the base of a NPN transistor 122. The emitter of the transistor 122 is connected to a reference potential such as ground and the collector of the transistor 122 is electrically disposed to the high and low positive voltage sources through a resistor 124 and a diode 126, respectively. The transistor 122 and the associated circuitry serve as a clipping amplifier to convert the sinusoidal output signal from the transistor oscillator into a square wave which appears at the collector of the transistor 122.

The output from the transistor 122 is connected to the base of a transistor 128 through a capacitor 130. A resistor 132 is electrically disposed between the base of the transistor 128 and the low positive source of voltage. Also, a series circuit including a diode 134, a resistor 136 and a capacitor 138 is included in the circuit between the base of the transistor 128 and the reference potential such as ground. An additional controlling circuit including a diode 140 and a resistor 142 is connected between the base of the transistor 128 and the junction of the resistor 136 and the capacitor 138. The collector of the transistor 128 is disposed to the low positive source of voltage through a resistor 144. The emitter of the transistor 128 is electrically connected to the negative source of voltage through a resistor 146.

The capacitor 130 and resistor 132 form a differentiating circuit to differentiate the square wave. The circuitry including the diode 134, the resistor 136, the capacitor 138, the diode 140 and the resistor 142 form a biasing circuit for the base of the transistor 128. This biasing circuit eliminates the positive pulse created by the differentiator from the square wave output of the transistor 122. Also, varying the voltage on the junction of the resistor 136, the capacitor 138 and the resistor 142 determines the width of the negative pulse produced by the differentiator. The negative pulse, therefore, is used as an input to control the output of the transistor 128. The output from the transistor 128 appears at the collector of the transistor 128 and is a pulse output having a pulse width dependent upon the pulse width of the negative signal applied to the base of the transistor 128. The pulse signal appearing on the collector of the transistor 128 is shaped to have the pulse width of individual pulses equal to one-third of the entire pulse period. For example, the signal can have a 0.1 microsecond pulse as part of each 0.3 microsecond period.

The pulse signal is applied to the base of a transistor 152. The emitter of the transistor 152 is electrically disposed to a reference potential such as ground. The collector of the transmitter 152 is connected to first terminals of primary windings of transformers 154, 156 and 158. The transformers are connected in parallel. The second terminals of the primary windings of the three transformers are disposed to the low positive voltage source through resistors 160, 162 and 164, respectively. Bypass capacitors 166, 168 and 170 are electrically connected between the second terminals of the primary windings of the three transformers and a reference potential such as ground. The transistor 152 and the associated circuitry operate as a current amplifier to supply an input signal to the primary winding of the transformers 154, 156 and 158.

The secondary winding of transformer 154 is electrically disposed between the base of a current control member such as a transistor 172 and a reference potential such as ground. The base of the transistor 172 is also connected to the low positive voltage source through a resistor 174. In a like manner, the secondary winding of the transformer 156 is coupled to a transistor 176 and a resistor 178. Similarly, a transistor 180 and a resistor 182 are connected to the secondary winding of the transformer 158. The emitters of the transistors 172, 176 and 180 are all disposed to a reference potential such as ground.

The collector of transistor 172 is connected through the primary winding of a pair of transformers 184 and 186 to one terminal of a resistor 188. The other terminal of the resistor 188 is disposed to the low positive voltage source. A series parallel arrangement of a diode 190 connected in series with the parallel combination of a capacitor 192 and a resistor 194 is electrically disposed across the parallel combination of the primary windings of the transformers 184 and 186. A pair of clock pulse signals are taken from the secondary windings of the transformers 184 and 186.

In a similar fashion to transistor 172, transistor 176 has an output circuit including transformers 196 and 198 and a series parallel combination of diode 200, capacitor 202 and resistor 204. Also, the transistor 180 has an output circuit including transformers 206 and 208 and diode 210, capacitor 212 and resistor 214. The clock generator shown in FIGURE 1 therefore has six clock pulse outputs from the six transformers 184, 186, 196, 198, 206 and 208. It will be appreciated that more or less clock pulse outputs could be generated by either the addition of or elimination of transistors and associated circuitry.

The operation of the output circuits of the clock generator will be explained using transistor 172 and its associated circuitry as illustrated. A pulse signal from the transformer 154 is applied to the base of the transistor 172 to bias the transistor conductive and non-conductive. When the transistor is biased to be conductive the voltage on the collector is low. At this time current flows from the low positive voltage source through the primary windings of the transformers 184 and 186. This produces a back E.M.F. within the transformers. The diode 190 is poled so that the back E.M.F. cannot produce a current flow through the parallel combination of the capacitor 192 and the resistor 194.

When the transistor 172 is biased non-conductive, the voltage on the collector of the transistor causes current to flow through the diode 190 to charge the capacitor 192. The capacitor 192 has a large capacitance value so that it slowly discharges through the resistor 194. When the capacitor 192 is charged, the voltage at the collector of the transistor 172 increases in accordance with the charge. More specifically, the voltage at the collector of the transistor 172 is dependent upon the amount of energy which was stored in the transformers 184 and 186 when the transistor 172 was conductive. Since this voltage is dependent upon the energy stored, the actual voltage on the collector of the transistor 172 is variable in accordance with that energy.

Figure 1A:
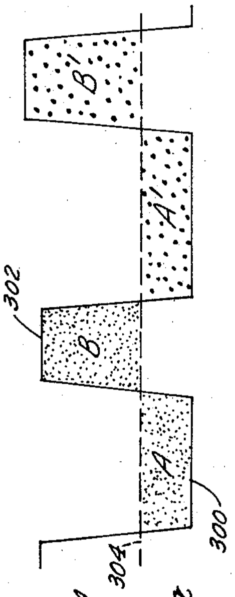
FIGURE 1A is a diagram used in explaining the operation of a portion of the circuit of FIGURE 1.

Referring to FIGURE 1A, a curve of the voltage waveform on the collector of the transistor 172 is shown. When the transistor 172 is conductive the voltage falls to a value shown by the line 300. When the transistor is rendered non-conductive the voltage rises to a value shown by the line 302. During the time that the transistor 172 is conductive, the area A indicates the amount of energy which is passed into the primary windings of the transformers 184 and 186. When the transistor is non-conductive, the area indicated by the letter B is the energy transmitted by the transformers 184 and 186. It is desirable to keep the energy in the area A equal to the energy in the area B. This maintains an average current, shown by line 304, at a constant value. If, however, the energy received by the primary windings of the transformers 184 and 186 is increased, for example, as shown in the area A′, it is desirable to increase the energy in the next succeeding pulse. This is done automatically as shown by area B′, since a greater amount of energy would be stored in the transformers 184 and 186 which results in a higher voltage appearing on the collector of the transistor 172 during the B′ area. The total effect of the circuit is to maintain the average current at a constant value.

It will also be noted that a plurality of transistors and associated circuitry is used to develop the clock pulse signals for use through the computor. Also, the clock pulse signals are independent of each other. Additionally, the transformers 184, 186, 196, 206 and 208 are step-down transformers to step down the voltage of and decrease the impedance path for the clock pulse signals. This produces a low impedance clock pulse signal of a constant voltage value throughout the computor. Variations in load on one of the clock pulse signals does not affect the others since all the clock pulse signals are independent of each other.

The transformers 184, 186, 196, 198, 206 and 208 are grounded on the primary side and ungrounded on the secondary side. This is advantageous since it isolates the clock pulse signals from the ground system. This isolation helps to maintain the waveform of the clock pulses since spurious ground signals could enter into the clock pulse signal. The secondary lead wires which carry the clock pulse signals are twisted closely together. The twisting reduces radiation of the clock pulses and also reduces the impedance of the path that the clock pulse signals must follow. This again helps to prevent a degradation of the clock pulse signals.

Figure 2:
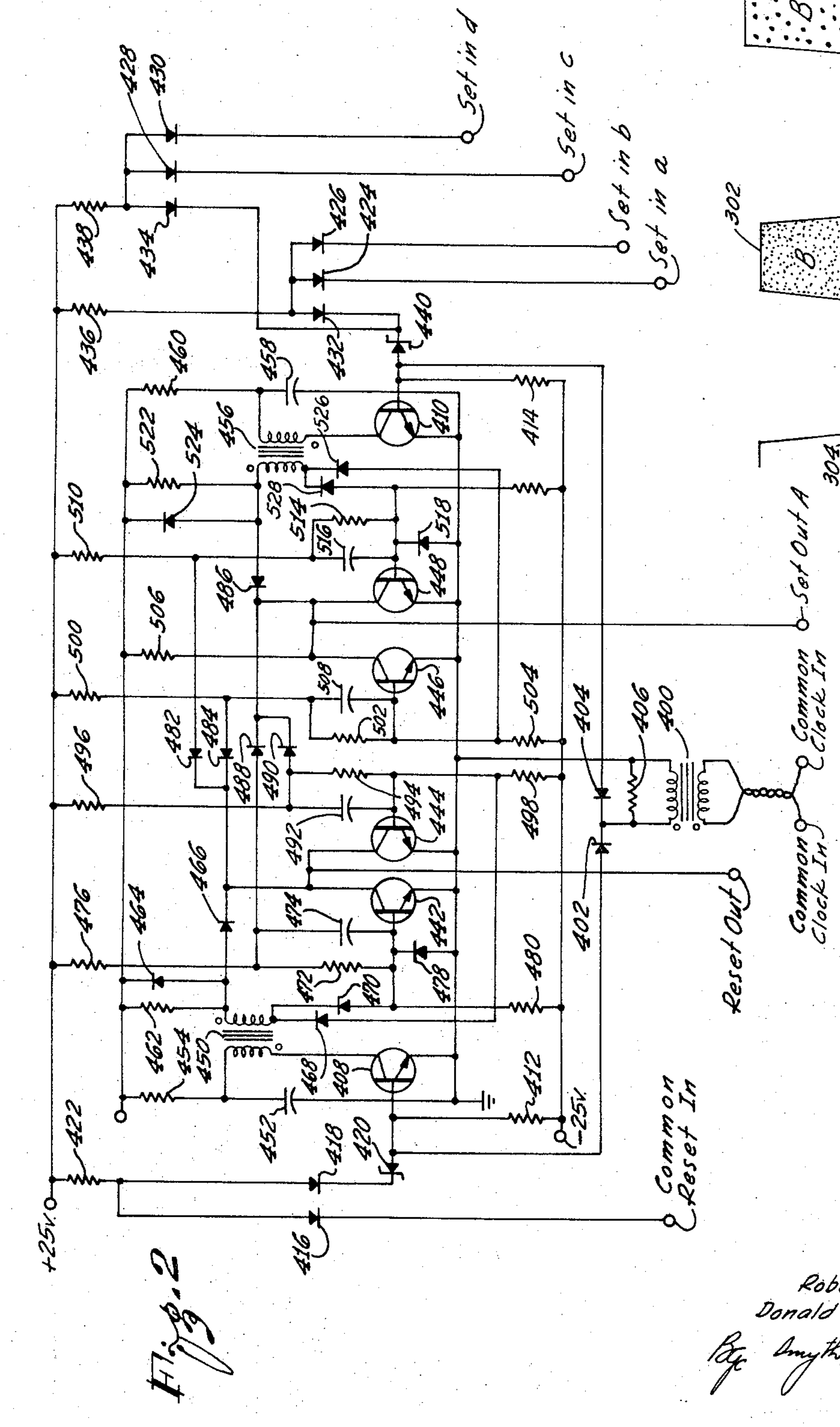
FIGURE 2 is a schematic diagram of a flip-flop including input circuitry which is controlled by the clock pulses produced by the clock generator of FIGURE 1.

FIGURE 2 illustrates a flip-flop controlled by the clock signals produced by the clock generator of FIGURE 1. It will be appreciated that a plurality of flip-flops as shown in FIGURE 2 could be used, one for each clock pulse signal. The twisted pair of wires carrying the clock pulse signal 5 is connected to the primary winding of a transformer 400. The secondary winding of the transformer 400 is electrically disposed between a reference potential such as ground and the junction of a pair of diodes 402 and 404. A resistor 406 is connected across the secondary winding of the transformer 400. The clock pulse signal is coupled to the base of a pair of transistors 408 and 410 through the diodes 402 and 404. Additionally, the bases of the transistors 408 and 410 are disposed through a pair of resistors 412 and 414 to the negative source of voltage.

The transistor 408 is used as part of a circuit to control the reset operation of the flip-flop and the transistor 410 is used as part of a circuit to control the set function of the flip-flop. A reset input is applied to the base of the transistor 408 through diodes 416, 418 and Zener diode 420. The high positive voltage source is applied to the junction of the diodes 416 and 418 through a resistor 422. The various diodes operate to provide a signal at the base of the transistor 408 when both the reset signal and the clock pulse are present at the same time. When both signals are present the transistor conducts. When the reset signal is present without the clock pulse, the base of transistor 408 is held at the same value as the clock signal. During the periods between clock pulses, this voltage holds the transistor non-conductive. When the clock signal is present without the reset signal, the base of the transistor 408 is held at the voltage present between reset signals. This voltage also holds the transistor 408 non-conductive. The Zener diode 420 is designed to break down at a small voltage value. When there is a signal present from the gate the Zener breaks down to conduct the signal to the base of the transistor 408.

By way of illustration, the circuitry associated with the set transistor 410 is more complicated. Four set input signals are shown to operate as a pair of "AND" gates, each independent of each other. These "AND" gates are shown by four diodes 424, 426, 428 and 430. A pair of diodes 432 and 434 operate as an "OR" gate for the signals to pass the signals from the "AND" gates. The gates are provided with biasing from the high positive voltage source through resistors 436 and 438. The set signal is coupled through a Zener diode 440 in the same manner as the Zener diode 420 couples the reset signal. The transistors 408 and 410 are not flip-flop transistors but are used to provide signals to operate transistors 442, 444, 446 and 448 as a flip-flop. The transistors 442 and 444 are in parallel and the transistors 446 and 448 are also in parallel.

The output signal from the transistor 408 appears at its collector. The output signal at the collector is coupled to one terminal of a primary winding of a transformer 450. The other terminal of the primary winding of the transformer 450 is connected to the junction of capacitor 452 and resistor 454. The second terminal of the resistor is applied to the low positive source of voltage and the second terminal of the capacitor 452 is applied to a reference source such as ground. The emitter of the transistor 408 is also connected to a reference potential such as ground. In a like manner, transistor 410 controls the set function of the flip-flops and has its collector coupled through a transformer 456 to the junction of a capacitor 458 and a resistor 460.

One terminal of the secondary winding of the transformer 450 is connected to the junction of resistor 462, diode 464 and diode 466. The resistor 462 and the diode 464 are coupled together to the low positive voltage source. The other terminal of the secondary winding of the transformer 450 is coupled through a pair of diodes 468 and 470 to the bases of the transistors 442 and 444, respectively. An RC circuit, including a resistor 472 and a capacitor 474 in parallel, is electrically disposed between the base of the transistor 442 and one terminal of a resistor 476. The other terminal of the resistor 476 is connected to the high positive voltage source. A diode 478 is disposed between the base of the transistor 442 and a reference potential such as ground. Also, a resistor 480 is connected between the base of the transistor 442 and the negative voltage source.

The collectors of the transistors 442, 444 are connected together and to the junction of diodes 466, 482 and 484. In a similar fashion, the collectors of the transistors 446 and 448 are connected together and to the junction of diodes 486, 488 and 490. The diodes 488 and 490 form paths between the bases of transistors 442 and 444 and the collectors of transistors 446 and 448. In a similar manner, diodes 482 and 484 form paths between the bases of transistors 446 and 448 and the collectors of transistors 442 and 444.

An RC circuit including a capacitor 492 and resistor 494 is disposed between the diode 490 and the base of the transistors 444. The RC circuit is connected to one terminal of a resistor 496. The other terminal of the resistor is connected to the high positive voltage source. A resistor 498 connects the base of the transistor 444 with the negative voltage source. The transistors 446 and 448 are associated with circuit elements similar to the elements associated with transistors 442 and 444. These are, for example, resistors 500, 502, 504 and 506 associated with transistor 446, and capacitor 508 connected in parallel across resistor 502. Similarly, resistors 510, 512 and 514 are associated with transistor 448. Capacitor 516 is connected in parallel across resistor 514. A diode 518 and the diode 486 are coupled in the circuit in a similar manner to diodes 466 and 478. Also, resistor 522 and diode 524 are in a similar position to diode 464 and resistor 462. Lastly, the pair of diodes 526 and 528 are disposed between the secondary winding of the transformer 456 and the bases of transistors 446 and 448 in a similar manner to diodes 468 and 470.

The operation of the flip-flop will be explained with reference to a resetting of the flip-flop. At this time, transistors 442 and 444 are conducting so that the voltage at the collectors of these transistors is low. Conversely transistors 446 and 448 are non-conducting and the voltage at the collectors is high. When a clock pulse and reset signal are applied simultaneously, the transistor 408 is biased conductive. When this occurs, current flows in the primary winding of transformer 450. Energy is, therefore, stored within the transformer 450. The windings of transformer 450 are arranged to have a positive voltage at the cathodes of diodes 468 and 470. This tends to keep the transistors 442 and 444 cut off. Also, the transformer 450 has a negative voltage at the plate of diode 466. Current is therefore prevented from flowing from the secondary winding of the transformer 450 since the diodes are all back biased. Energy is however, being stored in the transformer 450 and this energy is used at a later time to provide a triggering of the flip-flop. The transformer stores the energy so that the flip-flop can be triggered in a short period of time. Also, sufficient energy is stored to control other circuits in the computer if this is desired.

When the clock pulse subsides, the transistor 408 is biased non-conductive. The collector of the transistor 408 therefore goes positive. The transformer 450 therefore provides a positive voltage at the plate of the diode 466 and a negative voltage at the cathodes of the diodes 468 and 470. The transistors 442 and 444 are now biased non-conductive due to the signals developed on the base of the transistors from the transformer 450. The current path from the transformer 450 is through the diode 466 to the collector of the transistors 442 and 444 through the distributed capacity in the circuit to ground; and through the diode 468 and the diode 470 back to the secondary winding of the transformer.

The high voltage present on the collectors of the transistors 442 and 444 provides the reset output signal from the flip-flop. This high voltage is then carried through diodes 482 and 484 to be applied to the base of transistors 446 and 448 to render the transistors 446 and 448 conductive. The diodes 482 and 484 operate as a gate and are biased by the high positive voltage source. Since the diodes also have a small voltage drop the diodes provide an immunity from spurious noise in the two halves of the flip-flop equal to this voltage drop. A definite signal is therefore necessary to drive the flip-flop from one stable state to the other.

The low voltage on the collectors of the transistors 446 and 448 is coupled through diodes 488 and 490 to the base of transistors 442 and 444 to hold these transistors nonconductive. The flip-flop circuit therefore maintains the stable state until a set signal plus a clock signal is received at the Zener diode 440 to bias the transistor 410 conductive. When this occurs, storage is provided in the transformer 456 and at the end of the clock period when the transistor 410 is again non-conductive, the energy stored in the transformer 456 switches the transistors 446 and 448 to a non-conductive state and the transistors 442 and 444 to a conductive state.

The circuit operates in this fashion with a very quick triggering of the transistors from one state to another since the triggering operation occurs as soon as the clock pulse subsides. Also, the storing of the energy in the transformer during the clock pulse provides the energy to quickly switch the flip-flop from one stable to the other. As mentioned above, the provision of the diodes 482, 484, 488 and 490 allows for an immunity between the two sides of the flip-flop so that transient and spurious noise signals cannot disturb the flip-flop and erroneously switch it from one state to another.

It will be apparent to one skilled in the art that the foregoing discussion was illustrative only and that other embodiments may be constructed in accordance with the concepts of the invention. The invention, therefore, is only to be limited by the appended claims.

We claim:

1. A clock generator including,
- first means for producing an alternating signal,
- second means operatively coupled to the first means for shaping the alternating signal to produce a pulse at a particular time in each alternation of the signal,
- a plurality of output stages having input and output terminals and with the output response at the output terminal of each output stage independent of the load on the output terminals of the other output stages,
- a plurality of transformers each having a primary winding and a secondary winding,
- means for providing a reference voltage,
- means connected to the primary winding in each transformer for connecting the pirmary winding to the reference voltage means and to the second means for applying each pulse to the primary winding of the transformer to produce a clock signal in the transformer in response to each pulse introduced to the primary winding, and
- a plurality of third means each operatively coupled to the secondary winding in a different one of the transformers and to the input terminals of a different one of the output stages in the plurality for applying the clock signal to the input terminals of the output stages to produce signals at the output terminals of the output stages where such signals are independent of the reference voltage.

2. The clock generator of claim 1 including means operatively coupled to the third means for distributing the signals substantially without radiation and substantially without changes in the electrical characteristics of the signals.

3. The clock generator of claim 1, including,
- a plurality of current control members each having first and second states of conductivity,
- a plurality of means each connected to a different one of the current control members and the second means for maintaining the current control member in the first state of conductivity to produce an accumulation of energy in the associated transformer and for producing the second state of conductivity in the current control member in response to each pulse from the second means, and
- means responsive to the production of the second state of conductivity in each current control member for providing for a discharge of the energy accumulated in the associated one of the transformers to obtain the production of the clock signal in the transformer.

4. In combination in an electrical circuit for generating a clock signal,
- first means for producing an alternating signal,
- second means operatively coupled to the first means for shaping the alternating signal to produce a pulse at a particular time in each alternating signal,
- third means for generating a reference voltage,
- fourth means operatively coupled to the second means and the third means and responsive to the pulse signal and the reference voltage for producing a clock signal independent of the reference voltage and having an average amplitude level which remains substantially constant during the period between a plurality of the pulses, and
- fifth means operatively coupled to the third means and responsive to the clock signal for distributing the clock signal throughout the electric circuit substantially without radiation and substantially without changes in the electrical characteristics of the clock signal.

5. The combination set forth in claim 4 wherein
- the fourth means includes energy storage means and a current control member and wherein the current control member has first and second states of operation and wherein the current control member is normally in the first state of operation and wherein the energy storage means is connected to the current control member to store energy during the operation of the current control member in the first state and wherein the current control member is converted to the second state of operation upon the production of each pulse by the second means and wherein means are connected to the energy storage means to obtain a discharge of the energy in the energy storage means upon the operation of the current control member in the second state.

6. In an electrical circuit including means for generating a clock signal,
- first means for producing an alternating signal,
- second means operatively coupled to the first means for shaping the alternating signal to produce a pulse upon the occurrences of each alternating signal,
- third means operatively coupled to the second means and responsive to each pulse for producing a clock signal, the third means including storage means for storing energy during a first particular period of the clock signal and for releasing such stored energy during the remaining period of the clock signal in accordance with the duration of the first particular period for providing the clock signal with a substantially constant average amplitude level over a plurality of clock pulses, and
- fourth means operatively coupled to the third means and responsive to the clock signal for distributing the clock signal throughout the electric circuit substantially without radiation and substantially without changes in the electrical characteristics of the clock signal.

7. In an electrical circuit including means for generating a clock signal, first means for producing an alternating signal, second means operatively coupled to the first means for shaping the alternating signal to produce a pulse upon the occurrence of each alternating signal, third means operatively coupled to the second means and responsive to each pulse for producing a clock signal having an average amplitude level which remains substantially constant over a plurality of clock signals, the third means including a transformer having primary and secondary windings and having a circuit including a unidirectional device and a capacitor coupled across the primary winding of the transformer, and fourth means operatively coupled to the third means and responsive to the clock signal for distributing the clock signal throughout the electric circuit substantially without radiation and substantially without changes in the electrical characteristics of the clock signal.

8. In combination, first means for producing a plurality of pulses on a periodic basis, means for providing a reference voltage, second means operatively coupled to the first means and the reference voltage means and responsive to the pulses for producing clock signals independent of the reference voltage and having a substantially constant average amplitude level during the period between a plurality of the pulses, third means operatively coupled to the second means and responsive to the clock signals for distributing the clock signals throughout the electric circuit substantially without radiation and substantially without changes in the electrical characteristics of the clock signals, and fourth means having first and second states of operation and operatively coupled to the third means and responsive to the clock signals for operating in the first state at first particular times and for operating in the second state at second particular times in synchronism with the clock signals.

9. The combination set forth in claim 8 wherein the second means includes a transformer having a primary winding and a secondary winding and having the primary winding connected to the first means and the reference voltage means and having the secondary winding connected to the third means.

10. In an electrical circuit, means for providing a reference voltage, first means operatively coupled to the reference voltage means for producing a plurality of clock signals having a substantially constant average amplitude over a plurality of the clock signals and having characteristics independent of the reference voltage, second means operatively coupled to the first means and responsive to the clock signals for distributing the clock signals throughout the electric circuit substantially without radiation, third means for producing a control signal having first and second amplitude levels, fourth means operatively coupled to the second and third means and responsive to the first amplitude level of the control signal for attenuating the clock signals and responsive to the second amplitude level of the control signal for passing the clock signals without attenuation, fifth means having first and second operating states, and sixth means operatively coupled to the fourth and fifth means for inductively coupling the signals from the fourth means to the fifth means to control the operation of the fifth means between the first and second states in accordance with the passing and attenuation of the clock signals.

11. In the electrical circuit set forth in claim 10, the first means including transformer means having a primary winding connected to the reference voltage means and having a secondary winding connected to the second means and further including a current control member for controlling the transfer of energy into and out of the transformer means on a periodic basis to produce the clock signals.

12. The circuit of claim 10 wherein the sixth means includes transformer means for storing energy during the appearance of the clock signals and for releasing such energy in response to the subsidence of the clock signals and wherein the sixth means further includes a current control member responsive to the clock signals and having first and second states of conductivity for providing the first state of conductivity during the appearance of the clock signals and for providing the second state of conductivity in response to the subsidence of the clock signals and for storing energy in the transformer means during the first state of conductivity in the current control member and for providing the release of the energy from the transformer means during the second state of operation of the transformer means.

13. In an electrical circuit, means for providing a reference voltage, first means coupled to the reference voltage means for using the reference voltage to produce a plurality of clock signals independent of the reference voltage means, second means operatively coupled to the first means for distributing the clock signals throughout the electric circuit without any substantial radiation, third means including inductive means operatively coupled to the second means and responsive to the clock signals for storing energy in the inductive means during the appearance of the clock signals and for releasing such energy from the inductive means in response to the subsidence of the clock signals, and fourth means having first and second states of operation and operatively coupled to the third means for changing between the first and second states of operation in response to the energy released by the third means.

14. In an electrical circuit, first means for producing clock signals, second means operatively coupled to the first means for distributing the clock signals throughout the electric circuit, third means including inductive means operatively coupled to the second means and responsive to the clock signals for storing energy during the appearance of the clock signals and for releasing such energy in response to the subsidence of the clock signals, the third means including a transformer having primary and secondary windings and a pair of unidirectional devices in series with the secondary winding, the transformer and unidirectional devices being arranged to impede the flow of energy out of the transformer during the appearance of the clock signals and to release the energy upon the subsidence of the clock signals, and fourth means having first and second states of operation and operatively coupled to the third means for changing between the first and second states of operation in response to the energy released by the third means.

15. In combination, means for providing pulses at controlled periods of time.

means for providing a reference voltage, a current control member having first and second states of operation,
a transformer having a primary winding and a secondary winding,
means connecting the pulse means to the current control member to produce the first state of operation in the current control member during the production of the pulses and to produce the second state of operation in the current control member in the period between pulses,
means connecting the reference voltage means and the current control member to the primary winding of the transformer to produce a storage of energy in the transformer during the operation of the current control member in the first state,
means including a unidirectional member and impedance means connected to the primary winding of the transformer to produce a discharge of the energy in the transformer in the periods between the pulses from the pulse means and to produce clock signals in the primary winding of the transformer and to obtain an induction of these signals in the secondary winding of the transformer, and
means connected to the secondary winding of the transformer for receiving the clock signals induced in the secondary winding of the transformer.

16. The combination set forth in claim 15 wherein the impedance means comprises a resistor and a capacitor connected in series with the unidirectional means and the primary winding of the transformer.

17. The combination set forth in claim 16, wherein the secondary winding is floating relative to the reference potential and wherein means are connected to the secondary winding of the transformer to inhibit any substantial radiation of the clock signals.

18. A flip-flop circuit operated by a control signal having first and second amplitude levels including
a three-element variable impedance device including an input element, an output element and a control element,
a transformer having a primary and a secondary winding with each winding having first and second terminals,
means operatively coupled to the transformer for applying the control signal across the first and second terminals of the primary winding,
first unidirectional means poled in a first direction for coupling the first terminal of the secondary winding of the transformer to the output element of the variable impedance device, and
second unidirectional means poled in a second direction opposite to the first unidirectional means for coupling the second terminal of the secondary winding of the transformer to the control element of the variable impedance device.

19. The flip-flop circuit of claim 18 additionally including a third unidirectional means poled in the same direction as the second unidirectional means for coupling the input element to the control element of the variable impedance device.

20. A flip-flop circuit having a set and a reset state and operated by a pair of control signals including,
a pair of three-element variable impedance devices each including an input element, an output element and a control element,
a pair of transformers each having primary and secondary windings and with each winding having first and second terminals,
first means operatively coupled to one of the transformers for applying one of the control signals across the first and second terminals of the primary winding of the one transformer,
second means operatively coupled to the other of the transformers for applying the other of the control signals across the first and second terminals of the other transformer,
a pair of first unidirectional devices poled in a first direction for coupling the first terminals of the secondary windings of the pair of transformers to the output elements of the pair of variable impedance devices, and
a pair of second unidirectional devices poled in a second direction opposite to the direction of the first unidirectional devices for coupling the second terminals of the secondary windings of the pair of transformers to the control elements of the pair of variable impedance devices.

21. The flip-flop circuit of claim 20 additionally including a third pair of unidirectional devices poled opposite to each other and having one of the unidirectional devices coupled between the output element of the one and the control element of the other of the variable impedance devices and having the other unidirectional device coupled between the output element of the other and the control element of the one of the variable impedance devices.

References Cited

UNITED STATES PATENTS

| | | | |
|---|---|---|---|
| 3,083,304 | 3/1963 | Spriestersbach | 307—88.5 |
| 3,104,330 | 9/1963 | Hamilton | 307—88.5 |

ARTHUR GAUSS, *Primary Examiner.*

R. H. EPSTEIN, *Assistant Examiner.*